United States Patent
Boyce et al.

(10) Patent No.: US 7,680,356 B2
(45) Date of Patent: Mar. 16, 2010

(54) TECHNIQUE FOR BIT-ACCURATE COMFORT NOISE ADDITION

(75) Inventors: Jill MacDonald Boyce, Manalapan, NJ (US); Cristina Gomila, Princeton, NJ (US); Joan Llach, Princeton, NJ (US); Alexandros Michael Tourapis, West Wisdsor, NJ (US); Jeffrey Allen Cooper, Rocky Hill, NJ (US); Peng Yin, West Windsor, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 888 days.

(21) Appl. No.: 10/575,501

(22) PCT Filed: Oct. 12, 2004

(86) PCT No.: PCT/US2004/033712
§ 371 (c)(1),
(2), (4) Date: Apr. 11, 2006

(87) PCT Pub. No.: WO2005/039188
PCT Pub. Date: Apr. 28, 2005

(65) Prior Publication Data
US 2007/0058866 A1    Mar. 15, 2007

Related U.S. Application Data

(60) Provisional application No. 60/511,026, filed on Oct. 14, 2003.

(51) Int. Cl.
*G06K 9/40* (2006.01)

(52) U.S. Cl. ........................ 382/275; 348/607; 358/3.26
(58) Field of Classification Search ................. 382/100, 382/232, 233, 251, 254, 275, 274; 348/606–624; 358/1.9–3.31, 447, 461, 463
See application file for complete search history.

(56) References Cited

U.S. PATENT DOCUMENTS

| | | | |
|---|---|---|---|
| 4,935,816 | A | 6/1990 | Faber |
| 5,140,414 | A | 8/1992 | Mowry |
| 5,335,013 | A | 8/1994 | Faber |
| 5,374,954 | A | 12/1994 | Mowry |

(Continued)

FOREIGN PATENT DOCUMENTS

EP    0622000    10/1992

(Continued)

OTHER PUBLICATIONS

Search Report dated Feb. 25, 2005.

(Continued)

*Primary Examiner*—Anand Bhatnagar
(74) *Attorney, Agent, or Firm*—Robert D. Shedd; Robert B. Levy (57) ABSTRACT

The addition of comfort noise to an image serves to hide compression artifacts. To facilitate comfort noise addition, supplemental information accompanying a video image contains at least one parameter that specifies an attribute regarding comfort noise. Typically, the supplemental information includes parameters that function to turn the comfort noise on and off, as well as to indicate the level of noise to add, based on the expected level of compression artifacts.

10 Claims, 2 Drawing Sheets

U.S. PATENT DOCUMENTS

| | | | |
|---|---|---|---|
| 5,406,326 | A | 4/1995 | Mowry |
| 5,457,491 | A | 10/1995 | Mowry |
| 5,471,572 | A | 11/1995 | Buchner et al. |
| 5,475,425 | A | 12/1995 | Przyborski et al. |
| 5,629,769 | A | 5/1997 | Cookingham et al. |
| 5,641,596 | A | 6/1997 | Gray et al. |
| 5,687,011 | A | 11/1997 | Mowry |
| 5,709,972 | A | 1/1998 | Cookingham et al. |
| 5,767,860 | A | 6/1998 | Zimmer et al. |
| 5,768,403 | A * | 6/1998 | Suzuki et al. ............... 358/2.1 |
| 5,831,673 | A | 11/1998 | Przyborski et al. |
| 2002/0034337 | A1 | 3/2002 | Shekter |

FOREIGN PATENT DOCUMENTS

| | | |
|---|---|---|
| EP | 1175091 | 1/2002 |
| EP | 1215624 | 6/2002 |
| WO | WO9314591 | 7/1993 |
| WO | WO9520292 | 7/1995 |
| WO | WO9722204 | 6/1997 |
| WO | WO0146992 | 6/2001 |
| WO | WO0177871 | 10/2001 |
| WO | WO2004104931 | 12/2004 |

OTHER PUBLICATIONS

Christina Gomila: "SEI message for film grain encoding: syntax and results" JVT of ISO IEC MPEG ITU-T VCEG JVT-1013 Revision 2, Sep. 2, 2003, pp. 1-11, XP002308743 San Diego, CA, USA p. 1, Line 1-p. 5, Last Paragraph.

Christina Gomila, Alexander Kobilansky: SEI Message for Film Grain Encoding JVT of iso iec mpeg and itu-t vceg JVT-H022, May 23, 2003, pp. 1-14, XP002308742 Geneva Switzerland abstract p. 2, paragraph 1-p. 6, last line: figures 1,2 p. 9, paragraph 2.

Gisle Brontegaard: "Addition of Comfort Noise As Post Processing" ITU-T Study group 16, Video Coding Experts Group, Document Q15B15, Sep. 8, 1997, pp. 1-2, XP002319278 Sunriver, Oregon, USA p. 1, line 1-last line.

Greg Conklin et al: "Dithering 5-tap Filter for Inloop Deblocking" JVT of ISO IEC MPEG and ITU-T VCEG Document JVT-C056, May 6, 2002, pp. 1-16. XP002308744 Fairfax, Virginia, USA p. 1, line 1-p. 2, last line.

, Al-Shaykh et al, "Lossy Compression of Images Corrupted by Film Grain Noise," School of Electrical and Computer Engineering, 1996 IEEE.

, Al-Shaykh Et Al, "Restoration of Lossy Compressed Noisy Images," IEEE Transactions on Image Processing, vol. 8, No. 10, Oct. 1999.

, Al-Shaykh, "Lossy Compression of Noisy Images," IEEE Transactions on Image Processing, vol. 7, No. 12, Dec. 1998.

, Brightwell et al, "Automated Correction of Film Unsteadiness, Dirt and Grain," International Broadcasting Convention, Sep. 16-20, 1994, Conference Publication No. 397, IEE, 1994.

, Campisi et al, "Signal-Dependent Film Grain Noise Generation Using Homomorphic Adaptive Filtering," IEE Proceedings, Image Signal Process, vol. 147, No. 3, Jun. 2000.

, Zhao et al, "Constant Quality Rate Control for Streaming MPEG-4 Fgs. Video," Integrated Media Systems Center and Department of Electrical Engineering, University of Southern California, 2000 IEEE.

, Chavel et al, "Film Grain Noise in Partially Coherent Imaging," Optical Engineering, vol. 19, No. 3, May-Jun. 1980.

, Fischer et al, "Image Sharpening Using Permutation Weighted Medians," Department of Electrical Engineering, University of Delaware, fischer@ee.udel.edu, paredesj@ee.udel.edu, arce@ee.udel.edu.

, Illingworth et al, "Vision, Image and Signal Processing," The Institution of Electrical Engineers, IEE Proceedings, Jun. 2000, vol. 147, No. 3.

, Mclean et al, "Telecine Noise Reduction," XP-002285972, 2001 The Institute of Electrical Engineers.

, Oktem et al, "Transform Domain Algorithm for Reducing Effect of Film-Grain Noise in Image Compression," Electronics Letters, Oct. 14, 1999, vol. 35, No. 21.

, Peng et al, "Adaptive Frequency Weighting for Fine-Granularity-Scalability," Visual Communications and Image Processing 2002, Proceedings of SPIE, vol. 4671, 2002 SPIE 0277-786X/02.

, Prades-Nebot et al, "Rate Control for Fully Fine-Grained Scalable Video Coders," Visual Communications and Image Processing 2002, Proceedings of SPIE, vol. 4671 (2002), SPIE 0277-786X/02.

, Schaar et al, "Fine-Granularity-Scalability for Wireless Video and Scalable Storage," Visual Communications and Image Processing 2002, Proceedings of SPIE, vol. 4671 (2002) SPIE 0277-786X/02.

, Shahnaz et al, "Image Compression in Signal-Dependent Noise," Applied Optics, vol. 38, No. 26, Sep. 10, 1999.

, Visual Communication and Image Processing 2002, Proceedings of the SPIE, The International Society for Optical Engineering, vol. 4672, pt. 1-2, 2002.

, Yan et al, "Efficient Video Coding with Hybrid Spatial and Fine-Grain SNR Scalabilities," Department of Electronic Engineering, Beijing Institute of Technology, China.

, Yan et al, "Film Grain Noise Removal and Generation for Color Images," Department Electrical and Computer Engineers, University of Toronto, dimitris@comm.toronto.edu.

, Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.

, Yoshida, "Go with the Grain, Film R&D Chief Urges, for Art's Sake," EE Times, Feb. 07, 2005.

, Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.

* cited by examiner

TECHNIQUE FOR BIT-ACCURATE COMFORT NOISE ADDITION

CROSS-REFERENCE TO RELATED APPLICATIONS

This application claims the benefit, under 35 U.S.C. § 365 of International Application PCT/US2004/033712, filed Oct. 12, 2004, which was published in accordance with PCT Article 21(2) on Apr. 28, 2005 in English and which claims the benefit of U.S. provisional patent application No. 60/511,026, filed Oct. 14, 2003.

TECHNICAL FIELD

This invention relates to a technique for adding comfort noise to hide compression artifacts.

BACKGROUND ART

The decoding of a video stream compressed at low bit rate often yields visible artifacts noticeable to a viewer. Blockiness and structured noise patterns are common artifacts that arise when using block-based compression techniques. The human visual system has a greater sensitivity to certain types of artifacts, and thus, such artifacts appear more noticeable and objectionable than others. The addition of random noise to the decoded stream can reduce the noticeability of such compression artifacts, but large frame-to-frame differences created by adding random noise can itself produce artifacts that appear noticeable and objectionable.

The addition of a dither signal can reduce human sensitivity to image artifacts, for example to hide contouring and blocking artifacts. One prior art technique has proposed adding a random noise dither that is based on film grain to an image to disguise block effects. The rationale for adding such random noise is that random error is more forgiving than structured or correlated error. Other prior art techniques have proposed adding a dither signal to a video stream to hide compression artifacts. One past technique has proposed adding a random noise dither in the video encoding and decoding process in the in loop deblocking filter for the ITU/ISO H.264 video coding standard, commonly known as the JVT coding standard. The amount of dither to be added depends on the position of a pixel with respect to a block edge. Another prior technique has proposed adding that random noise subsequent to video decoding (i.e., adding noise as a "post process"), for use as comfort noise. The amount of noise added depends on the quantization parameter and on the amount of noise added to spatially neighboring pixels. The term "comfort noise" comes from the use of noise in audio compression to indicate noise pattern generated at the receiver end to avoid total silence that is uncomfortable to a listener.

Past comfort noise addition techniques, while effective, have not afforded a desired level of control over the addition of comfort noise, as well as the level of noise to be added.

BRIEF SUMMARY OF THE INVENTION

Briefly, in accordance with a preferred embodiment of the present principles, there is provided a technique for reducing artifacts in a video image. The method commences by the receipt of supplemental information that accompanies the video image. The supplemental information includes at least one parameter that specifies an attribute of comfort noise for addition to the video image. Temporally correlated comfort noise is generated and is then added to the image in accordance with the at least one parameter in the supplemental information.

DETAILED DESCRIPTION

In accordance with the present principles, the addition of comfort noise to an image serves to hide compression artifacts. To facilitate comfort noise addition in accordance with the present principles, supplemental information accompanying a video image contains at least one parameter that specifies an attribute regarding comfort noise. Typically, the supplemental information includes parameters that function to turn the comfort noise on and off, as well as to indicate the level of noise to add, based on the expected level of compression artifacts.

In the illustrated embodiment, the video image typically undergoes compression in accordance with the H.264 video compression standard. Accordingly, the supplemental information containing the at least one comfort noise parameter is carried by a registered user data Supplemental Enhancement Information (SEI) message.

Comfort Noise SEI Message

The use of a registered user data SEI message serves to indicate the use of comfort noise. This message applies to all pictures that follow it until an IDR picture or a new comfort noise or film grain SEI message arrives. Comfort noise SEI messages can only precede I pictures, and only one comfort noise SEI message can precede a particular I picture. I pictures are indicated by slice_type equal to 7, or by nal_ref_idc equal to 5. Table 1 below lists the SEI message elements related to comfort noise:

TABLE 1

| user_data_registered_itu_t_t35( payloadSize ) { | C | Descriptor |
|---|---|---|
| itu_t_t35_country_code | 5 | b(8) |
| itu_t_t35_payload_byte | 5 | b(8) |
| comfort_noise_flag | 5 | u(1) |
| if (comfort_noise_flag == 1) { | | |
| comfort_noise_qp_offset_idc | 5 | ue(v) |
| comfort_noise_qp_weight_offset_idc | 5 | ue(v) |
| } | | |
| } | | | comfort_noise_flag equal to 1 indicates that comfort noise addition is used.
comfort_noise_flag equal to 0 indicates that comfort noise addition is not used.
comfort_noise_qp_offset_idc indicates the quantization parameter offset used in the calculation of the additive comfort noise level, and may range in value from −51 to 52.
comfort_noise_qp_weight_offset_idc indicates a quantization parameter weight offset used in the calculation of the additive comfort noise level, and may range in value from −6 to 7.

Bit-Accurate Implementation of Comfort Noise

The addition of comfort noise in accordance with the present principles involves certain operations performed at the block level, and operations performed at the pixel level of a video image.

Block Level Operations

Figure 1:
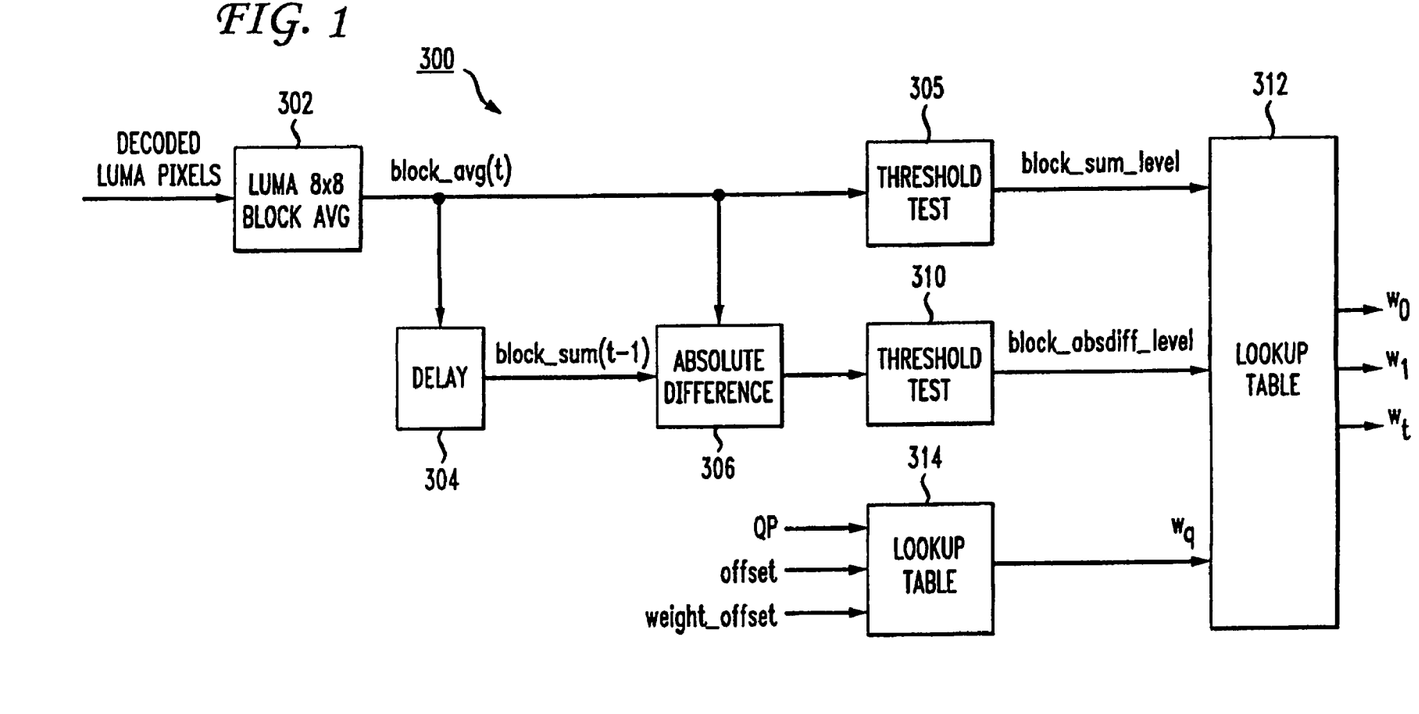
FIG. 1 depicts an apparatus in accordance with the present principles for generating comfort noise in connection with processing of the image block.

FIG. 1 depicts an apparatus 300 in accordance with an illustrative embodiment of the present principles for performing operations on 8×8 blocks of luma pixels for the calculating the relative weights of the three noise value terms $w_0$, $w_1$ and $w_f$ that control comfort noise addition. The apparatus 300 of FIG. 1 includes a processing block 302 that receives decoded luma pixels, the picture QP=(pic_init_minus26+26) and the comfort_noise_qp_offset_idc and comfort_noise_qp_weight_offset_idc parameters from the comfort noise SEI message. The term t indicates the current picture number, which undergoes a reset to 0 at the I-picture that follows a comfort noise SEI message.

The processing block 302 computes the average of the 8×8 luma pixel block of the current picture, t, as block_avg(t). A first threshold comparator-305 makes a comparison of this value to a threshold value, say 10. If block_avg(t)>10, the comparator 305 sets the block_sum_level=1, otherwise the value of the block_sum_level becomes 0. A delay 304 element delays value of block_avg(t) by one picture interval for input to an absolute difference block 306 which computes the absolute difference between the delayed value from the delay element 304 and the value of block_avg(t) directly received from the processing block 302. A second comparator 310 compares the difference computed by the absolute difference block 306 to a threshold value, say 3. If the threshold comparator determines that |block_avg(t)−block_sum(t−1)|>3, the comparator 310 sets the value of the term block_absdiff_level=0, otherwise block_absdiff_level=1. If t is equal to 0, block_absdiff_level=1.

For Standard Definition (SD) television resolutions and below, all pixel and block operations occur using the display resolution. For High Definition resolutions, block operations occur using 2×2 sub-sampled pixels (i.e. using the upper left pixel of each 2×2 block), so the 8×8 luma pixel avg involves adding 8×8=64 pixel values, but these values are spread over a 16×16 pixel range. For SD resolutions, storage of the block_avg values for the entire picture requires storage of 1/64 the size of a frame store. For HD resolutions, storage of block_avg values requires a storage capacity of 1/256 the size of a frame store.

A first look-up table (LUT) 312 receives the values of block_sum_level and block_absdiff_level from the threshold comparators 305 and 310, uses the values to find values for three sub-noise values $sw_0$, $sw_1$ and $sw_f$, which as described in greater detail, undergo scaling by a scaling factor $w_q$ generated by a second look-up table 314, to yield the noise values $w_0$, $w_1$ and $w_f$. Table 2 depicts the relationship between the block_sum_level and block_absdiff_level and the sub-noise values $sw_0$, $sw_1$ and $sw_f$ provided by the look up table 312.

TABLE 2

| block_absdiff_level | block_avg_level | $sw_f$ | $sw_1$ | $sw_0$ |
|---|---|---|---|---|
| 0 | 0 | 9 | 16 | 36 |
| 0 | 1 | 9 | 12 | 27 |
| 1 | 0 | 23 | 14 | 20 |
| 1 | 1 | 23 | 10 | 15 |

The look-up table 314 receives the value of the picture QP, and the values of the parameters comfort_noise_qp_offset_idc, and comfort_noise_qp_weight_offset_idc from the SEI message, and uses those values to calculate the scaling factor $w_q$ for scaling the sub-noise values $sw_0$, $sw_1$ and $sw_f$, to yield the noise values $w_0$, $w_1$ and $w_f$, which are used in the pixel level operations performed by the apparatus 400 described hereinafter with respect to FIG. 2.

Table 3 depicts the relationship between the value of Q and weight(Q) a precursor to the scaling factor $w_q$.

TABLE 3

| Q | 0 | 1 | 2 | 3 | 4 | 5 | 6 | 7 | 8 | 9 | 10 | 11 | 12 |
|---|---|---|---|---|---|---|---|---|---|---|---|---|---|
| weight(Q) | 0 | 0 | 0 | 0 | 0 | 0 | 0 | 0 | 0 | 0 | 0 | 0 | 0 |

| Q | 13 | 14 | 15 | 16 | 17 | 18 | 19 | 20 | 21 | 22 | 23 | 24 | 25 |
|---|---|---|---|---|---|---|---|---|---|---|---|---|---|
| weight(Q) | 0 | 0 | 0 | 0 | 0 | 0 | 0 | 1 | 1 | 1 | 2 | 2 | 2 |

| Q | 26 | 27 | 28 | 29 | 30 | 31 | 32 | 33 | 34 | 35 | 36 | 37 | 38 |
|---|---|---|---|---|---|---|---|---|---|---|---|---|---|
| weight(Q) | 3 | 3 | 3 | 4 | 4 | 4 | 4 | 4 | 4 | 4 | 5 | 5 | 5 |

| Q | 39 | 40 | 41 | 42 | 43 | 44 | 45 | 46 | 47 | 48 | 49 | 50 | 51 |
|---|---|---|---|---|---|---|---|---|---|---|---|---|---|
| weight(Q) | 5 | 5 | 5 | 5 | 5 | 5 | 5 | 6 | 6 | 6 | 6 | 6 | 6 |

The scaling factor $w_q$ is given by the relationship:

$$w_q = \mathrm{clip}((\mathrm{weight}(\mathrm{clip}(QP+\mathrm{comfort\_noise\_qp\_offset\_idc},0,51))+\mathrm{comfort\_noise\_qp\_weight\_offset\_idc}),0,7)$$

As discussed, scaling the sub-noise values $sw_0$, $sw_1$ and $sw_f$ by the scaling factor $w_q$ yields the noise values $w_0$, $w_1$ and $w_f$ as follows:

$$w_0 = sw_0 * w_q$$

$$w_1 = sw_1 * w_q$$

$$w_f = sw_f * w_q$$

Note that the determination of the current picture structure depends on the display rather than coding structure. For an interlaced display, pixels from the current field and previous field serve as the basis for calculations. For progressive display, pixels from the current frame and previous frame serve as the basis for calculations.

Pixel Level Operations

Figure 2:
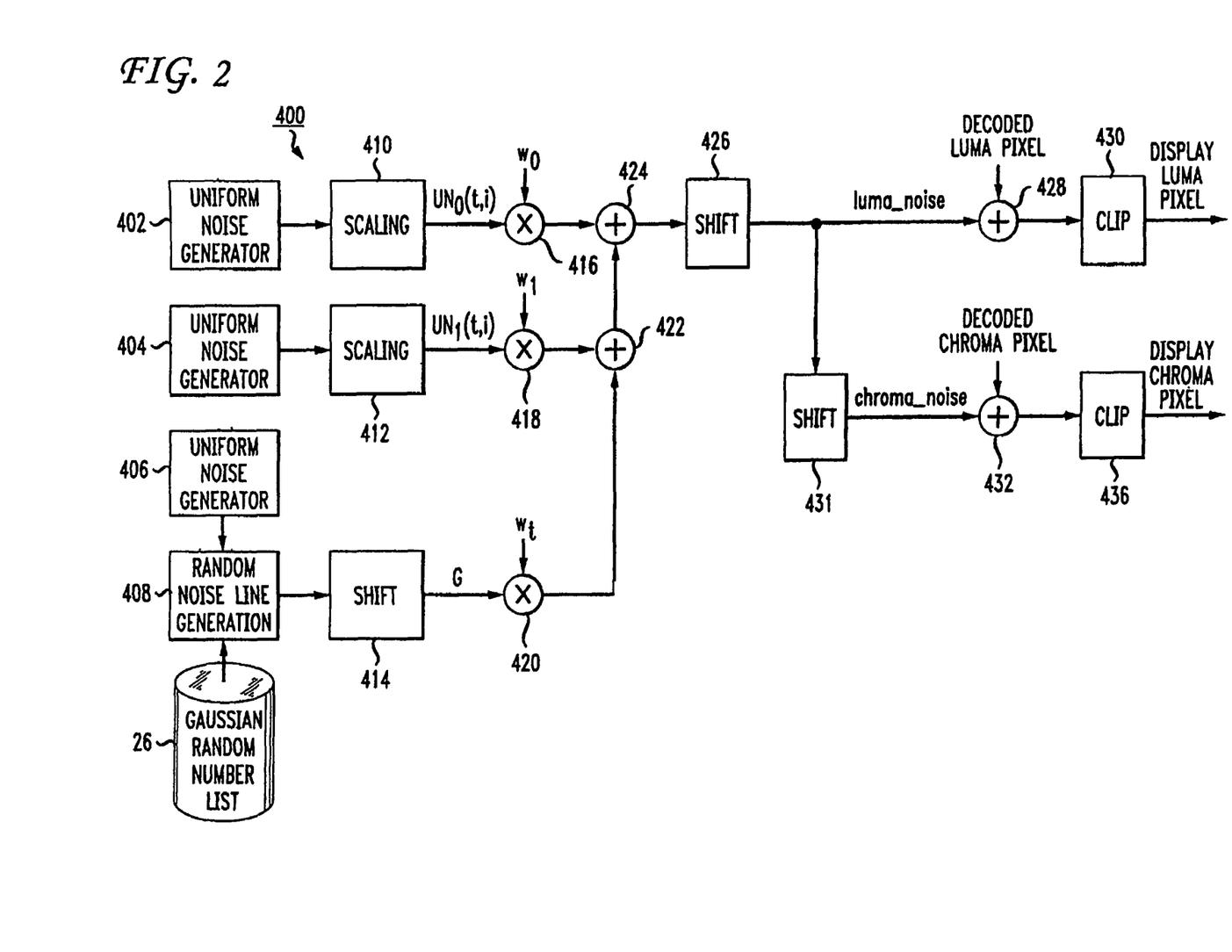
FIG. 2 depicts an apparatus for use with the apparatus of FIG. 1 for adding comfort noise on a pixel-by-pixel basis.

FIG. 2 illustrates an apparatus 400 that adds comfort noise on a pixel-by-pixel basis in accordance with the noise values $w_0$, $w_1$ and $w_f$ obtained from the apparatus 300 of FIG. 1. As described hereinafter, the apparatus 400 makes use of the same pre-stored Gaussian random number list and primitive polynomial generator. The apparatus 400 includes three distinct primitive polynomial uniform random number pattern generators 402, 404, and 406. For SD resolution, the pixel level operations are performed for all luminance pixels, and the generated luma noise value is applied to both luma and chroma pixels. Under such circumstances, the relationship pic_width=PicWidthInSamples$_L$ (as defined in the H.264 recommendation) applies. For H) resolutions, the pixel level operations are applied on ¼ of the pixels, using a 2×2 sub-sampling, and the generated noise value is applied to all pixels, using a 2×2 pixel repeat. Under such circumstances, the relationship pic_width=PicWidthInSamples$_L$>>1 will apply.

The first uniform random number pattern generator 402 initializes its seed value $x_0(i, \mathrm{seed\_}x_0(t))$ with the seed value seed_$x_0(0)$=3, upon the arrival of an SEI message containing comfort noise information. At each new frame t, the uniform random number pattern becomes initialized to seed_$x_0$(t) where seed_$x_0$(t)=seed_$x_0$(t−1)+2. The random noise generator 404 initiates its seed value (i, seed($x_1$(t)) with the seed value seed_$x_1$(t)=seed_$x_0$(t−1). This implies the relationship that that $x_1$(i, seed_$x_1$(t))=$x_0$(i, seed_$x_0$(t−1)).

The uniform random pattern number generators 402 and 404 will generate two new numbers $UN_0$(t,i) and $UN_1$(t,i), respectively, where $UN_1$(t,i)=$UN_0$(t−1,i), in accordance with the following relationships:

$$UN_0(t,i)=x_0(i,\text{seed}\_x_0(t))\% \ 32-16$$

$$UN_1(t,i)=UN_0(t-1,i)=x_1(i,\text{seed}\_x_1(t))\% \ 32-16$$

The third uniform random number generator 406 becomes initialized to 1 at the beginning of each displayed frame and serves to generate a fixed noise image for receipt by a random noise line generator 408. The random noise line generator 408 generates offsets into the Gaussian_list[ ] stored in the database 26 to access a line of 8 random numbers using the following operations, where i increments for each 8 values:

$$UN_f=x(i,1)$$

for n=0.7, G[n]=(Gaussian_list[($UN_f$+n)%2048]+1)>>1

The outputs of the uniform noise generators 402 and 404 undergo scaling by a separate one of scaling blocks 410 and 412, whereas the output of the random noise line generator undergoes shifting by a shift register 414. Multipliers 416, 418 and 420 each serve to multiply the output of a separate one of the scaling blocks 410 and 412 and the shift register 414 by a separate one of the noise values $w_0$, $w_1$, and $w_f$, respectively. A first summing block 422 sums the outputs of the multipliers 418 and 420, while a second summing block 424 sums the output of the first summing block 422 with the output of the multiplier 416. A shift register 426 shifts the output signal of the second summing block 426 to yield a noise value at position [r][s] of the noise image equal to:

$$m=\text{pic\_width}*r+s$$

$$\text{noise}[r][s]=(w_f*G[s\%8]+w_0*UN_0(t,m)+w_1*UN_0(t-1,m)+512)>>10$$

where $w_0$, $w_1$, and $w_f$ change at the block boundaries.

For SD sequences, the final noise luma_noise equals the added noise, while for HID sequences the final noise luma_noise is generated by performing a 2×2 upsampling of noise using pixel repetition.

The chroma noise is half the value of the final luma noise $$\text{chroma\_noise}[r][s](\text{luma\_noise}[r*2][s*2]+1)>>1$$

A first summing amplifier 428 sums the luma-noise with decoded luma pixels and the resultant sum undergoes clipping within the range of [0, 255] by a first clipper 430 to yield display luma pixels. A shift register 431 further shifts the output signal of the shift register 426 to yield the chroma_noise signal for summing by the summing amplifier 432 with decoded chroma pixels. The resultant sum undergoes clipping within the range of [0, 255] by a second clipper 436 to yield display chroma pixels.

The foregoing describes a technique for adding comfort noise to a video image.

APPENDIX

The list of the 2048 Gaussian distributed random numbers are:

```
char Gaussian[2048] = {
  0xFB, 0x05, 0x33, 0xFB, 0x14, 0xEF, 0x06, 0x1D, 0x26, 0x30, 0xD5, 0x01, 0x20, 0xD9, 0x16,
  0x1B,
  0xE7, 0x0A, 0x06, 0xFB, 0xF6, 0xF7, 0x10, 0xC1, 0x08, 0xFE, 0xCC, 0x09, 0x09, 0x23, 0x17,
  0xFB,
  0xED, 0x15, 0xFF, 0x25, 0xDF, 0x1A, 0xD3, 0x10, 0xE9, 0x0A, 0xFF, 0xE5, 0x18, 0x00,
  0xE4, 0xEC,
  0x00, 0x3C, 0xC1, 0xCB, 0xE8, 0x04, 0x07, 0x3F, 0x3D, 0x36, 0x19, 0x3F, 0x00, 0x03, 0x38,
  0x09,
  0x0E, 0x06, 0x26, 0x38, 0x28, 0xE2, 0xC1, 0x37, 0xE7, 0xF2, 0x01, 0xE8, 0xF5, 0x1D, 0xF2,
  0xDC,
  0x05, 0x38, 0x21, 0x27, 0xFF, 0xC7, 0xD5, 0xFE, 0xFE, 0x14, 0x1D, 0xD8, 0x18, 0xF3, 0xF1,
  0xEF,
  0xCC, 0x19, 0x08, 0xF4, 0xEF, 0xFA, 0xF9, 0xC1, 0xE5, 0xF5, 0xE5, 0xC1, 0xC8, 0x02,
  0xF4, 0xDC,
  0x3F, 0x3F, 0xFF, 0x14, 0x2B, 0xE0, 0xF9, 0x1B, 0x09, 0x2D, 0xD8, 0xE0, 0xE0, 0x11,
  0xFD, 0xE5,
  0x31, 0xFD, 0x2C, 0x3E, 0xF3, 0x2D, 0x00, 0x1F, 0x1D, 0xF9, 0xF5, 0x38, 0xF0, 0x3A, 0x06,
  0x0C,
  0x19, 0xF8, 0x35, 0xFD, 0x1A, 0x13, 0xEF, 0x08, 0xFD, 0x02, 0xD3, 0x03, 0x1F, 0x1F, 0xF9,
  0x13,
  0xEE, 0x09, 0x1B, 0x08, 0xE7, 0x13, 0x10, 0xEE, 0x3E, 0xED, 0xC5, 0x08, 0xF1, 0x00, 0x09,
  0x31,
  0x1E, 0x32, 0xFA, 0xDC, 0xF8, 0xE7, 0x31, 0x01, 0x01, 0x1D, 0x10, 0xFF, 0xFF, 0x04,
  0xEC, 0xCC,
  0xEE, 0x06, 0x3F, 0x07, 0xC1, 0xF1, 0xD5, 0xED, 0xE5, 0x16, 0xEC, 0x25, 0x0B, 0xF7,
  0xF5, 0xDD,
  0x25, 0xE6, 0x00, 0x10, 0xEA, 0x08, 0xD2, 0x1D, 0xE0, 0xDF, 0x1B, 0xCE, 0xF2, 0xD5,
  0xEF, 0xD2,
  0x21, 0x02, 0xDC, 0xE2, 0x2E, 0xEB, 0x06, 0xF4, 0xEE, 0xC1, 0xF8, 0x07, 0xC1, 0x1F, 0x11,
  0x0F,
  0x2E, 0x08, 0xE7, 0xE3, 0x23, 0x26, 0x28, 0x3F, 0x3F, 0x1E, 0x10, 0xCC, 0xD2, 0x00, 0x00,
  0x25,
  0xDE, 0x23, 0x3F, 0xF7, 0xC9, 0x0E, 0x0B, 0x07, 0x01, 0x13, 0x2D, 0x02, 0x14, 0x00, 0xFE,
  0x13,
```

-continued

0x07, 0x38, 0xF2, 0xEE, 0x19, 0x15, 0x35, 0x0D, 0x3B, 0x03, 0xD9, 0x0C, 0xDE, 0xF6, 0x2E, 0xFB,
0x00, 0x09, 0x14, 0xE7, 0x27, 0xC1, 0xEB, 0x3F, 0x08, 0x05, 0xF6, 0x0F, 0xE7, 0x0D, 0xD4, 0xD3,
0xED, 0xF7, 0xFC, 0x0C, 0xC6, 0x23, 0xF4, 0xEB, 0x00, 0x05, 0x2A, 0xCB, 0x13, 0xF0, 0xC1, 0x17,
0x19, 0xF4, 0xF6, 0x16, 0x00, 0x07, 0xEF, 0xDE, 0x00, 0xDC, 0x0C, 0xFD, 0x00, 0x0E, 0xFF, 0x16,
0x10, 0xF0, 0x3A, 0xEA, 0x27, 0xF5, 0xF8, 0xCA, 0xFB, 0xDD, 0x2C, 0xE9, 0x0B, 0xD3, 0x3B, 0xEE,
0x18, 0xC1, 0x1D, 0x10, 0xD8, 0xFB, 0xF8, 0xFD, 0x16, 0xC1, 0xF9, 0x2C, 0x3F, 0x08, 0x31, 0xED,
0xF0, 0x12, 0x15, 0xED, 0xF1, 0xF6, 0x34, 0xF7, 0x09, 0x09, 0xE3, 0xFC, 0x0F, 0x00, 0xC1, 0x10,
0x3F, 0xD6, 0x25, 0x0B, 0xEC, 0xE8, 0xC1, 0xCB, 0xF9, 0x16, 0xDB, 0x00, 0x0E, 0xF7, 0x14, 0xDE,
0xED, 0x06, 0x3F, 0xFF, 0x02, 0x0A, 0xDC, 0xE3, 0xC1, 0xFF, 0xFF, 0xE6, 0xFE, 0xC5, 0x2E, 0x3B,
0xD8, 0xE8, 0x00, 0x09, 0xEA, 0x21, 0x26, 0xFA, 0xF6, 0xC1, 0x11, 0xEC, 0x1B, 0x3B, 0xFE, 0xC7,
0xF5, 0x22, 0xF9, 0xD3, 0x0C, 0xD7, 0xEB, 0xC1, 0x35, 0xF4, 0xEE, 0x13, 0xFD, 0xFD, 0xD7, 0x02,
0xD5, 0x15, 0xEF, 0x04, 0xC1, 0x13, 0x22, 0x18, 0xE1, 0x24, 0xE8, 0x36, 0xF3, 0xD4, 0xE9, 0xED,
0x16, 0x18, 0xFF, 0x1D, 0xEC, 0x28, 0x04, 0xC1, 0xFC, 0xE4, 0xE8, 0x3E, 0xE0, 0x17, 0x11, 0x3A,
0x07, 0xFB, 0xD0, 0x36, 0x2F, 0xF8, 0xE5, 0x22, 0x03, 0xFA, 0xFE, 0x18, 0x12, 0xEA, 0x3C, 0xF1,
0xDA, 0x14, 0xEA, 0x02, 0x01, 0x22, 0x08, 0xD9, 0x00, 0xD9, 0x02, 0x3F, 0x15, 0x0D, 0x3F, 0xC1,
0x0D, 0xE5, 0xF3, 0x1B, 0x37, 0x17, 0x35, 0x00, 0xDA, 0x00, 0x1A, 0xFC, 0xF5, 0xEB, 0x3D, 0x36,
0x3F, 0x32, 0x21, 0x17, 0x02, 0x00, 0x3D, 0xFA, 0xE5, 0xF0, 0xE8, 0x2C, 0x20, 0xCC, 0xFE, 0x2F,
0xE6, 0x1F, 0x16, 0x0E, 0x17, 0x09, 0xEF, 0x07, 0x14, 0x17, 0xD0, 0xF4, 0x2F, 0xDB, 0x3F, 0xC7,
0x3F, 0xDF, 0x00, 0xF8, 0x19, 0xD1, 0x17, 0x05, 0x11, 0xEA, 0xDB, 0x2C, 0xCB, 0xFC, 0xE4, 0xF2,
0xCA, 0xF4, 0x3F, 0xE2, 0xFA, 0x26, 0xEA, 0x08, 0x09, 0x29, 0xF5, 0x04, 0x3F, 0xDF, 0x1A, 0x01,
0x0C, 0x06, 0x37, 0x15, 0xC8, 0xF5, 0x05, 0xF4, 0x29, 0x21, 0xFA, 0x25, 0xC3, 0x1D, 0x3F, 0xFB,
0x31, 0xF7, 0x1F, 0xED, 0x1A, 0x04, 0x03, 0x1E, 0xE5, 0x01, 0xE4, 0x38, 0xCC, 0xE3, 0x01, 0xFC,
0xE9, 0x24, 0x2A, 0xE5, 0xEF, 0x06, 0x3B, 0x0D, 0x2E, 0xDD, 0x06, 0xCF, 0xDD, 0xF6, 0x0E, 0x23,
0xD1, 0x09, 0xE6, 0x20, 0xFA, 0xE1, 0xF4, 0x20, 0x24, 0xFC, 0x3F, 0x00, 0xC1, 0x33, 0xF6, 0xDC,
0xC9, 0xCD, 0xFD, 0x0E, 0xEC, 0xF6, 0xE3, 0xF2, 0xF4, 0x09, 0xFE, 0xE7, 0x2F, 0xE3, 0xD1, 0xEE,
0x11, 0x09, 0xDE, 0x3F, 0xF7, 0xC1, 0xF5, 0xC5, 0xE6, 0x12, 0x25, 0xC1, 0x00, 0xFB, 0xC5, 0xE6,
0xF3, 0x13, 0x22, 0x08, 0x08, 0xC7, 0x2C, 0x1F, 0x0C, 0x12, 0xF5, 0x18, 0xCE, 0xF1, 0xFC, 0xD1,
0xE6, 0x02, 0x2E, 0xF5, 0xE8, 0xFC, 0x19, 0x01, 0xDB, 0xD4, 0xFB, 0xED, 0x3F, 0xD5, 0xF5, 0x09,
0x0A, 0x38, 0x25, 0x19, 0xF1, 0x2E, 0xE1, 0x03, 0xFB, 0x17, 0x12, 0x32, 0xEB, 0xF8, 0xE6, 0xFD,
0xEE, 0xDA, 0xF1, 0xF6, 0x1F, 0x0F, 0x1F, 0x0A, 0xC1, 0x0F, 0x1F, 0x12, 0x33, 0xD6, 0xFC, 0x26,
0x27, 0x1D, 0xD9, 0xFD, 0x11, 0x04, 0x28, 0xF4, 0xFC, 0x01, 0xF8, 0x23, 0x3F, 0x29, 0xD5, 0x1B,
0x09, 0xC5, 0xC3, 0x12, 0x05, 0x3F, 0x1C, 0xE5, 0x38, 0x06, 0x0C, 0x10, 0xFA, 0xE9, 0x0A, 0xFA,
0x02, 0x1C, 0x0D, 0x0C, 0x0C, 0xFB, 0xEE, 0x12, 0xD2, 0x26, 0x28, 0x04, 0x19, 0x06, 0x21, 0xFA,
0x00, 0x10, 0x16, 0xDB, 0x10, 0xED, 0xF5, 0xE8, 0xC1, 0xF3, 0x0F, 0xFC, 0x11, 0x06, 0x23, 0x06,
0x1C, 0x05, 0xE6, 0xD6, 0x1A, 0xEA, 0xEF, 0x00, 0x3F, 0x05, 0xDF, 0xEA, 0x17, 0xC7, 0x01, 0x05,
0x1C, 0xEF, 0x3B, 0xF7, 0xE2, 0x1A, 0xE3, 0xC1, 0xE8, 0xF5, 0x01, 0xFE, 0x08, 0xD8, 0xFE, 0x3F,
0x0C, 0x27, 0x21, 0x1F, 0xF4, 0x06, 0xE0, 0xEE, 0xC1, 0xF2, 0x0A, 0xE1, 0x20, 0xE6, 0xEC, 0x36,
0xE1, 0x07, 0xF6, 0x06, 0x0E, 0xE1, 0x0A, 0x0D, 0x2F, 0xEA, 0xE3, 0xC6, 0xFC, 0x27, 0xE8, 0x0B,
0xEB, 0xF8, 0x17, 0xE9, 0xC4, 0xEF, 0xF2, 0xE6, 0xEA, 0x0E, 0x3F, 0xFA, 0x18, 0xFC, 0xC1, 0x25,

-continued

0xF3, 0xF5, 0x2C, 0x1D, 0x05, 0xD1, 0x28, 0xE3, 0x1D, 0x1E, 0xF4, 0x14, 0xD3, 0xFF, 0xF6, 0xE3,
0xEA, 0xE3, 0xF5, 0xE6, 0x23, 0xF2, 0x21, 0xF1, 0xF5, 0x07, 0xF8, 0xDF, 0xF4, 0xF2, 0xE2, 0x17,
0x12, 0x08, 0x07, 0xEE, 0xF5, 0xFB, 0x04, 0xF3, 0xF7, 0x1D, 0x16, 0xE8, 0xE9, 0xFF, 0xF6, 0xD8,
0x0E, 0xDF, 0xC1, 0x25, 0x32, 0x02, 0xF8, 0x30, 0x11, 0xE0, 0x14, 0xE7, 0x03, 0xE3, 0x0B, 0xE4,
0xF7, 0xF4, 0xC5, 0xDC, 0x2D, 0x07, 0xF9, 0x27, 0xF0, 0xD9, 0xC1, 0xEF, 0x14, 0x26, 0xD7, 0x00,
0x1B, 0x0B, 0xDB, 0x3F, 0xF8, 0xF6, 0x06, 0x0F, 0x1B, 0xC8, 0xC1, 0x2C, 0x1B, 0x1E, 0x06, 0x1B,
0xFA, 0xC8, 0xF9, 0x0F, 0x18, 0xDF, 0xF8, 0x2D, 0xFC, 0x00, 0x0A, 0x22, 0xDD, 0x31, 0xF7, 0xC8,
0x20, 0xD3, 0xFC, 0xFC, 0xDD, 0x3F, 0x19, 0xD8, 0xE8, 0x0C, 0x1E, 0xE2, 0xC9, 0x03, 0xEC, 0x3F,
0x2B, 0xE0, 0x35, 0xC1, 0xFE, 0x11, 0xF9, 0x14, 0xE8, 0x06, 0x06, 0x24, 0xCE, 0xF3, 0x26, 0x3F,
0xFD, 0xCE, 0x2C, 0x12, 0x3C, 0x2C, 0xC2, 0xE3, 0x06, 0xD2, 0xC7, 0x0A, 0xDF, 0xD5, 0xD1, 0xC5,
0x15, 0xF2, 0xF1, 0x08, 0x02, 0xE6, 0xE2, 0x0A, 0xEB, 0x05, 0xDA, 0xE3, 0x06, 0x0E, 0x01, 0x03,
0xDC, 0x13, 0xE3, 0xFB, 0x36, 0xE6, 0x14, 0x21, 0xFA, 0xC1, 0xC1, 0xE8, 0x0B, 0x0E, 0x17, 0x11,
0x2D, 0x11, 0xF0, 0x39, 0xE7, 0xF0, 0xE7, 0x2D, 0x03, 0xD7, 0x24, 0xF4, 0xCD, 0x0C, 0xFB, 0x26,
0x2A, 0x02, 0x21, 0xD8, 0xFA, 0xF8, 0xF0, 0xE8, 0x09, 0x19, 0x0C, 0x04, 0x1F, 0xCD, 0xFA, 0x12,
0x3F, 0x38, 0x30, 0x11, 0x00, 0xF0, 0xE5, 0x3F, 0xC3, 0xF0, 0x1E, 0xFD, 0x3B, 0xF0, 0xC1, 0xE6,
0xEB, 0x1F, 0x01, 0xFE, 0xF4, 0x23, 0xE4, 0xF0, 0xEB, 0xEB, 0x10, 0xE4, 0xC1, 0x3F, 0x0C, 0xEF,
0xFB, 0x08, 0xD8, 0x0E, 0xE4, 0x14, 0xC1, 0xC1, 0x0A, 0xE9, 0xFB, 0xEF, 0xE1, 0xE7, 0xF0, 0xD8,
0x27, 0xDA, 0xDC, 0x04, 0x0D, 0xDC, 0xFC, 0xDB, 0xD6, 0xD6, 0xE4, 0x0C, 0x27, 0xFC, 0xD0, 0x11,
0xE0, 0x04, 0xE3, 0x07, 0x00, 0xEC, 0x10, 0xD5, 0xEA, 0x08, 0xFF, 0xFC, 0x1D, 0x13, 0x05, 0xCA,
0xED, 0x0B, 0x10, 0x08, 0xF2, 0x01, 0x19, 0xCA, 0xFE, 0x32, 0x00, 0x20, 0x0B, 0x00, 0x3F, 0x1E,
0x16, 0x0C, 0xF1, 0x03, 0x04, 0xFD, 0xE8, 0x31, 0x08, 0x15, 0x00, 0xEC, 0x10, 0xED, 0xE6, 0x05,
0xCA, 0xF7, 0x1C, 0xC1, 0x22, 0x0D, 0x19, 0x2E, 0x13, 0x1E, 0xE7, 0x16, 0xED, 0x06, 0x2A, 0x3C,
0x0D, 0x21, 0x16, 0xC9, 0xD7, 0xFF, 0x0F, 0x12, 0x09, 0xEE, 0x1D, 0x23, 0x13, 0xDA, 0xE9, 0x1D,
0xD9, 0x03, 0xE1, 0xEF, 0xFA, 0x1E, 0x14, 0xC1, 0x23, 0xFE, 0x0B, 0xE5, 0x19, 0xC1, 0x21, 0xFE,
0xEC, 0x0E, 0xE1, 0x1D, 0xFF, 0x00, 0xF7, 0xEA, 0xD2, 0xD8, 0xD0, 0xF9, 0xE6, 0xFB, 0xFB, 0xDA,
0x06, 0x00, 0x03, 0xDF, 0xC1, 0x3F, 0xF3, 0x0D, 0xFA, 0x08, 0xFA, 0xF3, 0x00, 0x04, 0xE9, 0xF0,
0xF9, 0x0D, 0xF1, 0xE3, 0x1D, 0x26, 0xC4, 0x0D, 0x13, 0xE5, 0xE1, 0xF1, 0xF6, 0xEE, 0xF1, 0xFD,
0xC1, 0xF4, 0xE2, 0x23, 0xC1, 0x38, 0xC1, 0x3F, 0x2B, 0xFD, 0x39, 0x36, 0x1A, 0x2B, 0xC1, 0x01,
0x07, 0x0B, 0x25, 0xCC, 0xE7, 0x01, 0x24, 0xD8, 0xC9, 0xDB, 0x20, 0x28, 0x0C, 0x1A, 0x3F, 0xEA,
0xE7, 0xCD, 0xEC, 0xE0, 0xF2, 0x27, 0xDF, 0x20, 0xF0, 0xF1, 0xFD, 0x3F, 0x00, 0xFA, 0xE7, 0x21,
0xF9, 0x02, 0xD2, 0x0E, 0xEF, 0xFD, 0xD3, 0xE4, 0xFF, 0x12, 0x15, 0x16, 0xF1, 0xDE, 0xFD, 0x12,
0x13, 0xE7, 0x15, 0xD8, 0x1D, 0x02, 0x3F, 0x06, 0x1C, 0x21, 0x16, 0x1D, 0xEB, 0xEB, 0x14, 0xF9,
0xC5, 0x0C, 0x01, 0xFB, 0x09, 0xFA, 0x19, 0x0E, 0x01, 0x1B, 0xE8, 0xFB, 0x00, 0x01, 0x30, 0xF7,
0x0E, 0x14, 0x06, 0x15, 0x27, 0xEA, 0x1B, 0xCB, 0xEB, 0xF7, 0x3F, 0x07, 0xFB, 0xF7, 0xD8, 0x29,
0xEE, 0x26, 0xCA, 0x07, 0x20, 0xE8, 0x15, 0x05, 0x06, 0x0D, 0x0D, 0x1E, 0x1C, 0x0F, 0x0D, 0x35,
0xF7, 0x1B, 0x06, 0x30, 0x02, 0xFD, 0xE2, 0xCD, 0x2F, 0x35, 0xEB, 0x1A, 0x0D, 0xE9, 0xFC, 0x34,
0xE6, 0x17, 0x2C, 0x33, 0xF0, 0x13, 0xEF, 0x1B, 0x19, 0x23, 0xD1, 0xEF, 0xD5, 0xCB, 0xF7, 0xF1,
0x04, 0xF7, 0x27, 0xF9, 0x26, 0x02, 0xF7, 0xCB, 0x2A, 0x0A, 0xEA, 0xED, 0xEC, 0x04, 0xF2, 0x25,
0x17, 0xDB, 0x1E, 0xC1, 0x3C, 0xC9, 0xE4, 0xF1, 0x14, 0x03, 0x27, 0x25, 0x21, 0x1C, 0x14, 0xF4,

-continued

```
0x0F, 0x12, 0xE9, 0xEE, 0x15, 0xDC, 0xEE, 0x1F, 0x3F, 0xDE, 0xE7, 0x2C, 0xF0, 0xE2,
0x1D, 0xE5,
0x15, 0x07, 0x02, 0xDF, 0x06, 0xD3, 0x1F, 0x0E, 0xED, 0xFF, 0x29, 0xFF, 0xED, 0xD6,
0xD6, 0x1C,
0x11, 0xDE, 0xE2, 0x0E, 0xEE, 0xD1, 0xD9, 0x02, 0x0F, 0xFE, 0xF0, 0xD9, 0xF6, 0xFC,
0xDA, 0x16,
0x03, 0xD2, 0xDD, 0x20, 0x04, 0xE8, 0x3F, 0xDE, 0x0C, 0xFB, 0xED, 0xC7, 0x1F, 0xC1,
0xCE, 0x02,
0xF1, 0x37, 0x0B, 0xE3, 0x20, 0xCE, 0x0D, 0xEB, 0x0A, 0xE3, 0xF3, 0xDC, 0x01, 0xD2,
0x02, 0x3F,
0x02, 0x25, 0xD5, 0xFC, 0xEB, 0xCE, 0x3F, 0x00, 0x3E, 0x2D, 0xE1, 0x19, 0x1C, 0x01,
0x28, 0xC1,
0x3F, 0x27, 0x3F, 0xF2, 0x0E, 0x3A, 0xDB, 0xF8, 0xE4, 0x34, 0x18, 0x16, 0x0C, 0xDD,
0x18, 0xED,
0xCB, 0x0F, 0xF0, 0x01, 0xFB, 0x14, 0xC1, 0x19, 0xCC, 0xEB, 0xEE, 0x19, 0x00, 0x17,
0x2B, 0xFC,
0x26, 0x0D, 0xEC, 0xF4, 0x2D, 0x2B, 0xE5, 0x25, 0x05, 0x10, 0x26, 0x1D, 0x3F, 0x3F,
0xFD, 0xDC,
0x18, 0xF0, 0xCB, 0xEF, 0x12, 0x1C, 0x1A, 0xF8, 0xFE, 0x29, 0x1A, 0xCB, 0x1A, 0xC2,
0x0E, 0x0B,
0x1B, 0xEB, 0xD5, 0xF8, 0xFD, 0x17, 0x0B, 0xFC, 0x00, 0xFA, 0x37, 0x25, 0x0D, 0xE6,
0xEE, 0xF0,
0x13, 0x0F, 0x21, 0x13, 0x13, 0xE1, 0x12, 0x01, 0x0A, 0xF1, 0xE7, 0xF3, 0x1A, 0xED, 0xD5,
0x0A,
0x19, 0x39, 0x09, 0xD8, 0xDE, 0x00, 0xF9, 0xE9, 0xEA, 0xFF, 0x3E, 0x08, 0xFA, 0x0B,
0xD7, 0xD7,
0xDE, 0xF7, 0xE0, 0xC1, 0x04, 0x28, 0xE8, 0x1E, 0x03, 0xEE, 0xEA, 0xEB, 0x1C, 0xF3,
0x17, 0x09,
0xD6, 0x17, 0xFA, 0x14, 0xEE, 0xDB, 0xE2, 0x2A, 0xD9, 0xC1, 0x05, 0x19, 0x00, 0xFF,
0x06, 0x17,
0x02, 0x09, 0xD9, 0xE5, 0xF3, 0x20, 0xDD, 0x05, 0xCB, 0x09, 0xF8, 0x05, 0xF1, 0x1F, 0xE5,
0x12,
0x25, 0xF8, 0x3F, 0xDC, 0xF0, 0xF2, 0xC5, 0x34, 0x21, 0x35, 0xCD, 0xCC, 0x23, 0x1E, 0x01,
0x0B,
0xFF, 0x10, 0xFE, 0xF9, 0xDF, 0xF9, 0xF5, 0xE5, 0x07, 0xE1, 0x25, 0x1C, 0xC9, 0x00, 0x29,
0xF3,
0x0A, 0x25, 0xED, 0xF8, 0xFB, 0x20, 0xF8, 0xC1, 0xE5, 0xE0, 0x0F, 0x2F, 0x3A, 0x01,
0xC8, 0xFD,
0xCA, 0xE1, 0x30, 0x04, 0x19, 0x03, 0x25, 0xF3, 0x24, 0x38, 0xEE, 0xC9, 0x2F, 0xE7, 0x0B,
0xFA,
0xF7, 0x1B, 0x0A, 0x0B, 0x2D, 0x2D, 0x0B, 0xE8, 0x08, 0xDB, 0x0B, 0x04, 0xE8, 0xD0,
0xEE, 0x18,
0xEF, 0x11, 0xC1, 0xD6, 0x15, 0x3F, 0xF5, 0xF4, 0x2A, 0x29, 0xEF, 0xF0, 0xFA, 0x36, 0x33,
0xED,
0x19, 0xDF, 0x11, 0x09, 0xF5, 0x18, 0xF1, 0x3F, 0x14, 0x0C, 0xD2, 0xFF, 0xFF, 0x34, 0x01,
0xE4,
0xF8, 0x03, 0x3F, 0xF8, 0x3E, 0x21, 0x22, 0xE2, 0x0F, 0xEF, 0x1A, 0xE4, 0xF5, 0x08, 0x15,
0xEF,
0xF3, 0xE4, 0xDF, 0xF6, 0xFC, 0xE8, 0x21, 0x06, 0x20, 0x02, 0x17, 0x1B, 0x3F, 0xDB, 0x16,
0x2C,
0xE0, 0xFA, 0xDA, 0xD8, 0xD3, 0x0B, 0x0E, 0x10, 0xED, 0xD5, 0xF0, 0x30, 0xD3, 0x13,
0x04, 0xE1,
0xFF, 0xFB, 0x3F, 0xE8, 0xEE, 0xE5, 0x0B, 0xEF, 0xEF, 0xE6, 0x2C, 0xD3, 0x00, 0x18,
0x26, 0xFE,
0xC1, 0x08, 0x16, 0xFE, 0xDC, 0x00, 0xE4, 0xF7, 0xDC, 0x0E, 0x2E, 0x1D, 0x18, 0x0A,
0x08, 0x37,
0xC9, 0x10, 0xD7, 0x17, 0x17, 0xFB, 0x11, 0xD5, 0x15, 0x1C, 0xD0, 0x3F, 0xF8, 0x00, 0x00,
0xED,
0xC1, 0xFF, 0x00, 0x1F, 0x2E, 0x00, 0x12, 0xE0, 0xE2, 0xF7, 0x13, 0xC1, 0x1C, 0x18, 0xF8,
0x3F,
0x2C, 0xEB, 0xCA, 0xE7, 0xF8, 0x03, 0xEE, 0x22, 0x17, 0xF9, 0x35, 0x14, 0x1C, 0x03, 0x09,
0x03,
0x01, 0x2B, 0xD4, 0xD2, 0xF8, 0xF6, 0xF5, 0x06, 0x03, 0xFE, 0xDA, 0xD3, 0xFF, 0x03,
0xEF, 0xFE,
0x09, 0x01, 0xC9, 0x02, 0xDF, 0xD8, 0x3C, 0xF7, 0xF0, 0xEE, 0xD6, 0x3F, 0x21, 0x16, 0x08,
0x17
};
```

The invention claimed is:

1. A method for reducing subjective artifacts in a video image, comprising the steps of:
receiving supplemental information that includes at least one parameter that specifies an attribute of comfort noise for addition to an image;
generating temporally correlated noise and
making a determination, in accordance with the at least one parameter, whether to add the temporally correlated noise, and if so, adding such noise to the image at a level in accordance with the at least one parameter, to substantially hide artifacts.

2. The method according to claim 1 further comprising the step of generating the temporally correlated noise by the steps of:

obtaining a block pixel average;

accessing a look-up table using the block pixel average and picture quantization parameters to obtain weights of temporal correlation factors for weighting the added noise.

3. The method according to claim 2 wherein the step of accessing a look-up table further comprises the step of accessing a look-up table containing Gaussian random numbers.

4. The method according to claim 2 wherein the step of adding temporally correlated noise includes the step of adding temporally correlated noise to one of luma or chroma pixels.

5. The method according to claim 4 further comprising the step of adding temporally correlated noise includes adding noise to both luma and chroma pixels.

6. Apparatus for reducing subjective artifacts in a video image, comprising:

means for receiving supplemental information that includes at least one parameter that specifies an attribute of comfort noise for addition to an image;

means for generating temporally correlated noise; and means, responsive to the at least one parameter, for making a determination whether to add the temporally correlated noise, and if so for adding such noise to the image at a level in accordance with the at least one parameter, to substantially hide artifacts.

7. The apparatus according to claim 6 further comprising:

means for obtaining a block pixel average;

means for accessing a look-up table using the block pixel average and picture quantization parameters to obtain weights of temporal correlation factors for weighting the added noise.

8. The apparatus according to claim 7 wherein the look up contains Gaussian random numbers.

9. The apparatus according to claim 6 wherein the means for adding temporally correlated noise adds temporally correlated noise to one of luma or chroma pixels.

10. The apparatus according to claim 9 wherein the means for adding temporally correlated noise adds temporally correlated noise to both luma and chroma pixels

* * * * *